No. 826,887. PATENTED JULY 24, 1906.
A. ROSENBERG.
ILLUMINATING APPARATUS DESIGNED FOR USE IN FLASH SIGNALING.
APPLICATION FILED DEC. 20, 1904.
4 SHEETS—SHEET 1.
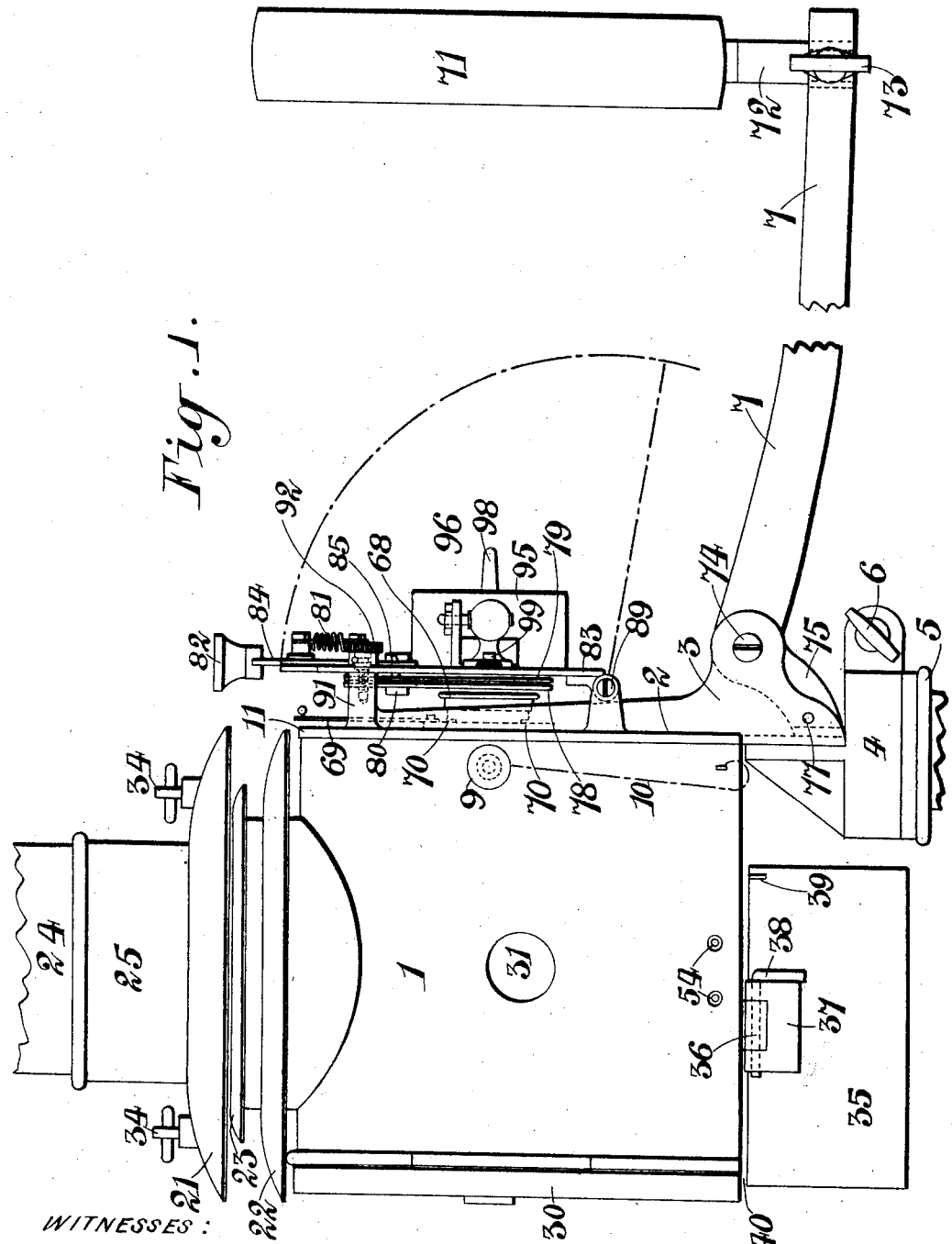
WITNESSES:
W. M. Avery
J. O. Davis
INVENTOR
Augustus Rosenberg
BY Munn & Co
ATTORNEYS No. 826,887. PATENTED JULY 24, 1906.
A. ROSENBERG.
ILLUMINATING APPARATUS DESIGNED FOR USE IN FLASH SIGNALING.
APPLICATION FILED DEC. 20, 1904.
4 SHEETS—SHEET 2.
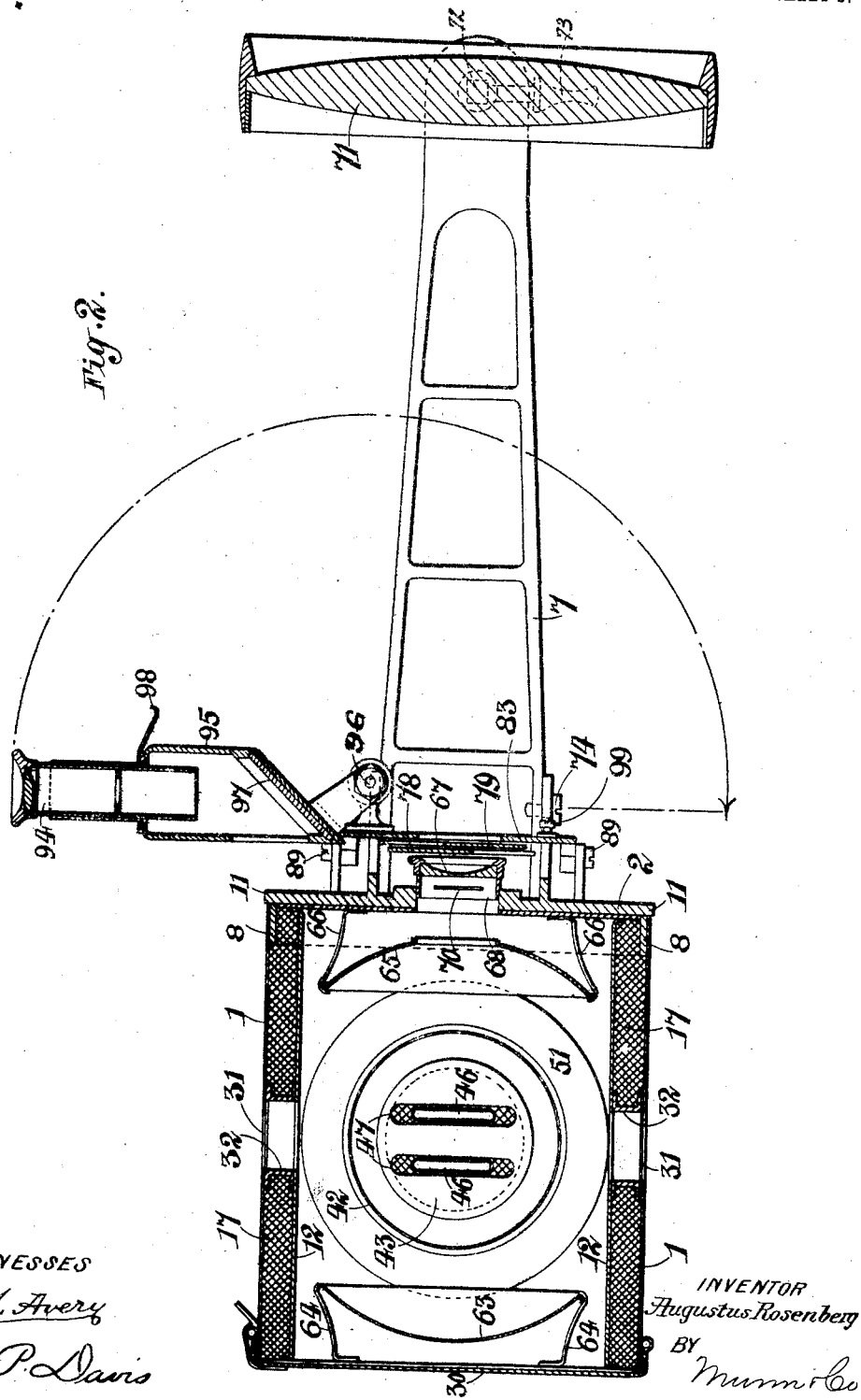
WITNESSES
W. M. Avery
J. P. Davis
INVENTOR
Augustus Rosenberg
BY
Munn & Co
ATTORNEYS No. 826,887. PATENTED JULY 24, 1906.
A. ROSENBERG.
ILLUMINATING APPARATUS DESIGNED FOR USE IN FLASH SIGNALING.
APPLICATION FILED DEC. 20, 1904.
4 SHEETS—SHEET 3.
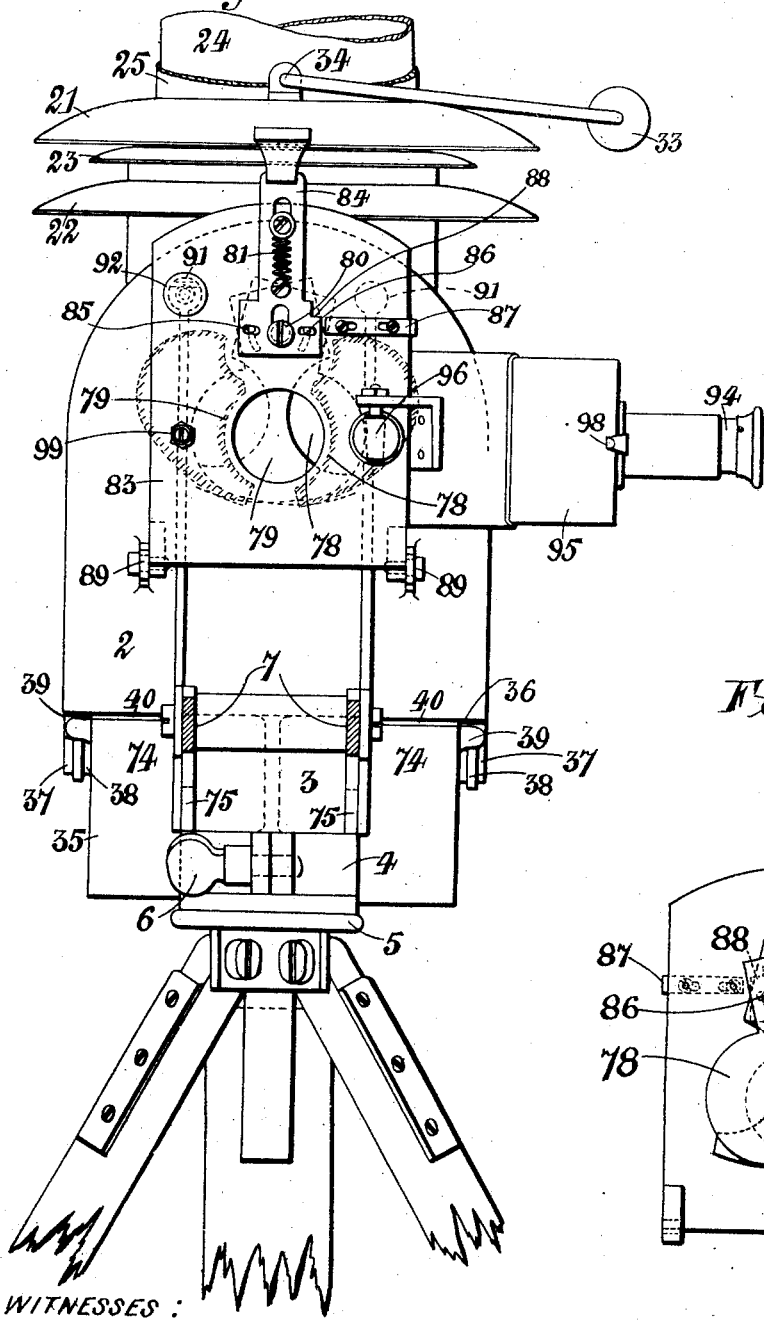
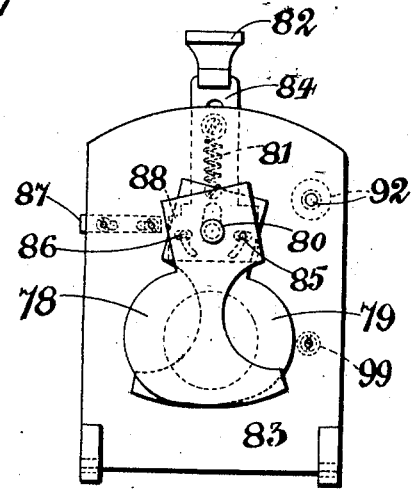
WITNESSES:
W. M. Avery
A. H. Davis
INVENTOR
Augustus Rosenberg
BY
Munn & Co.
ATTORNEYS

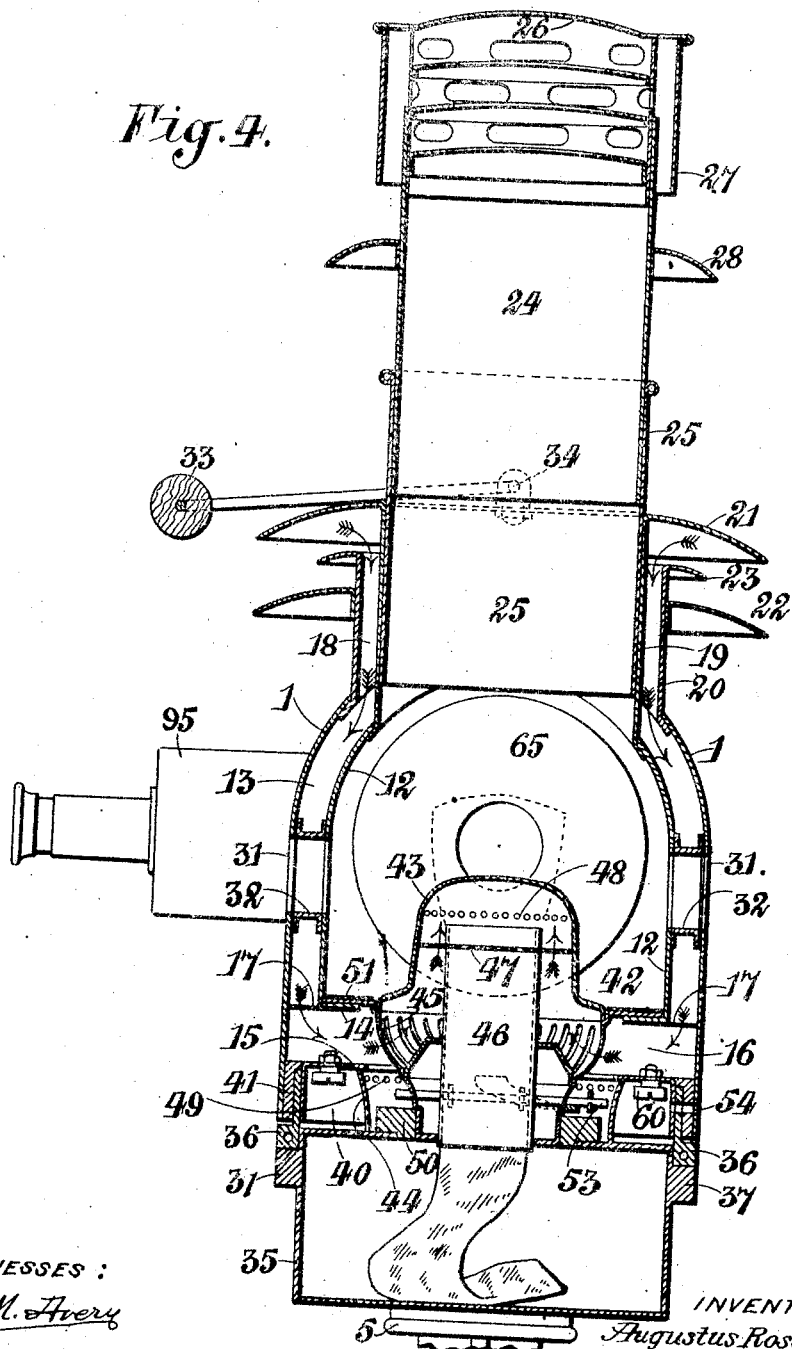

UNITED STATES PATENT OFFICE.

AUGUSTUS ROSENBERG, OF LONDON, ENGLAND, ASSIGNOR TO THE INTERNATIONAL OXY-GENERATOR SYNDICATE LIMITED, (MANUFACTURERS,) OF LONDON, ENGLAND.

ILLUMINATING APPARATUS DESIGNED FOR USE IN FLASH-SIGNALING.

No. 826,887.  Specification of Letters Patent.  Patented July 24, 1906.

Application filed December 20, 1904. Serial No. 237,664.

*To all whom it may concern:*

Be it known that I, AUGUSTUS ROSENBERG, engineer, a subject of the King of Great Britain, and a resident of 259 High Holborn, London, England, have invented certain new and useful improvements in and connected with illuminating apparatus more especially designed for use in flash-signaling, of which the following is a specification.

This invention relates to apparatus primarily designed for optical signaling, but applicable also as search-light apparatus.

The invention has for its objects to provide self-contained apparatus capable of being packed away in a small compass when not in use and wherein, as compared with other similar apparatus, first, a larger proportion of the light may be utilized; second, the projected beam of light will have a relatively greater range of transmission or penetrative power coupled with diminished liability of the signals being read by persons for whom they are not intended.

The invention has further for its object to enable the apparatus to be used as a sighting-telescope for rapidly and accurately alining the beam on the distant station and for enabling signals thence transmitted to be received and read; to cause the flashing-shutter to give instant full opening without obscuration, thus permitting a very clear distinction to be obtained between the dot and the dash signals of the Morse or similar codes, and, third, to avoid liability of vibrations being imparted to the beam of light consequent on the working of the shutter.

In the drawings, Figure 1 is a side elevation of the preferred form of the apparatus. Fig. 2 is a horizontal section of the same on the plane of the optical axis. Fig. 3 is a transverse section showing a face view of the flashing-shutter and its support. Fig. 4 is a central vertical transverse section of the lantern fitted with a paraffin-oil lamp. Fig. 5 is a rear view of the plate 83, showing the shutter-blades.

The same reference-numerals denote like parts in all the figures.

The apparatus comprises a closed lantern 1 whereof the front wall is formed by a plate 2, integral with a casting 3, provided at its lower part with a horizontal ring 4, which is fitted to rotate, as usual, about the head 5 of the tripod-stand, the ring 4 being split and provided with a thumb-screw 6, whereby the apparatus can be clamped in any angular position to which it may be adjusted. The plate 2 is situated approximately in or slightly to the rear of the vertical axis of the tripod-head, the lantern-body 1, and lens-supporting arm 7, hereinafter described, (which is also attached to the casting 3,) projecting toward the rear and front of said axis respectively, so as to cause the weight of the apparatus as a whole to be approximately balanced about its point of support.

In order that the lantern-body 1 may be easily detached from the plate 2 to allow access to be readily obtained to the interior of the lantern, the front edge of the outer wall of the body 1 fits over a rearwardly-projecting flange 8 on the plate 2 and is secured in position by a set-screw 9 at each side of the lantern. Each of the screws 9 passes through a hole in the plate, forming the outer wall of the lantern-body and enters a tapped hole in the flange, the screw-head turning in a ring or shackle on the end of a chain 10, attached to the casting 3, whereby its loss is prevented. The front edge of the lantern-body fits against the rim 11, formed by the outstanding margin of the plate 2, so as to effectually prevent the access of draft to the interior of the lantern through the joint.

The air-supply to the interior of the lantern may be derived, as in the construction illustrated, through a so-called "top-feed" arrangement, whereby the air is heated before reaching the point of combustion and the temperature of the flame is maintained as high as practicable. For this purpose the sides, top, and bottom of the lantern-body are constructed with a double wall, the inner wall 12 of the sides and top being separated from the outer wall 1 by an air-space 13, and the inner bottom plate 14 being separated from the outer bottom plate 15 by an air-space 16, the spaces 13 and 16 communicating with one another at each side of the lantern through a screen 17, of wire-gauze, whereby the current of air passing through the spaces on its way to the point of combustion is caused to distribute itself equally over the whole cross-sectional area of the passage constituted by the spaces 13 and 16, and thus to become equally heated by being spread evenly over the surface of the inner wall of the lantern. The air-supply reaches the top of the space 13 by way of an annular passage 18, surrounding the lantern-chimney, the inner and outer walls of said passage being formed by tubes 19 and 20, rising from corresponding apertures in the top of the inner and outer walls 12 and 1 of the lantern. The upper end of the inner tube 19 carries a wide flange 21, adapted to exclude rain and direct downdrafts from the passage 18, and in order to also exclude fluctuating drafts caused by gusts of wind, which after glancing off the rounded top of the lantern in an upward direction might be diverted downward by the flange 21 into the annular passage 18, a wide flange 22, similar to 21, surrounds the outer tube 20 at a convenient distance below the level of flange 21, another and narrower auxiliary flange 23 being preferably provided around the lip of the tube 20.

The chimney 24 is made telescopic, so as to be capable of being collapsed as far as practicable within the lantern-body when not in use, the lower section 25 being fitted to slide through the tube 19. The chimney-cowl 26 may be constructed in any usual manner for preventing the access of direct downdraft to the interior of the lantern, and in order as far as possible to prevent the admission of fluctuating drafts caused by gusts of wind glancing upward from the sides of the chimney and so gaining entrance beneath the depending outer skirt 27 of the cowl a flange 28 is provided on the upper section of the chimney at a convenient level beneath the edge of the skirt 27.

The lantern-body is closed at rear by a hinged door 30, and at each side of the lantern small apertures 31, registering with one another and connected by a tube 32, as shown, are provided in the inner and outer walls opposite to the flame for the purpose both of enabling the latter to be inspected and also of affording light at night-time for the respective attendants whose duty it is to read out to the signaler the message to be transmitted and to record the signals received from the distant station.

To enable the apparatus to be conveniently carried, a bail-handle 33 is pivoted, preferably, to the flange 21, as at 34, the arrangement being such that when the chimney is collapsed the handle can be raised so as to straddle over the chimney-top.

Fig. 4 shows the details of the preferred construction of a chimneyless lamp for burning paraffin-oil and the like, this lamp being preferably provided with more than one flat wick (two being shown in Fig. 2) arranged one behind the other.

The oil-reservoir 35 is supported beneath the outer bottom plate 15 of the lamp-body by lugs 36 on the outer wall 1, the said wall extending below the plate 15, which lugs enter sockets 37 on the reservoir and are locked therein by dowel-pins 38, the reservoir being provided with stops 39 for preventing the complete withdrawal of the dowel-pins.

The inner and outer bottom plates 14 15 are apertured to give passage to the lamp-burner, the shoulder or rim 42 of whose outer cone 43 is adapted to fit against and so close the aperture in the upper plate 14, while a coaming 44, upstanding from the reservoir, encircles and closes the aperture in the lower plate 15. By this arrangement the only air-supply to the lamp (except as hereinafter mentioned) is that derived from the space 16 separating the plates 14 and 15, which air has already become highly heated by traversing the passages 18 and 13, already described. The heated air passes from the space 16 through the usual apertured support 45 of the burner-cone 43 into the space within said cone surrounding the wick tube or tubes 46, and in order to so subdivide the stream of air which rises around the wick-tubes as to guard against sudden fluctuations in the pressure of the current a perforated diaphragm 47 is provided within the cone 43, so as to extend over the whole area of the air-feed passage therein.

In order to prevent the burner from becoming overheated, a row of perforations 48 is provided around the upper part of the cone 43, the diaphragm 47 also serving to enable the current of air passing to the burner to abstract a considerable amount of heat from the cone 43 and wick tube or tubes 46.

In order to prevent as far as possible transmission of heat from the burner to the oil-reservoir, there is interposed between the reservoir top and the shoulder surrounding the lower part of the burner and upon which the latter rests a thick washer 50, of non-conductive material, wherein is formed the bayonet-joint slot for securing the burner in position, so that no direct conduction of heat can take place at this point from the metal burner to the metal top of the reservoir. Moreover, the inner bottom plate 14 of the lantern-body is covered by a layer of asbestos, upon which rests a plate 51, of talc, so that radiant heat falling upon plate 14 is reflected therefrom. This plate 14 may also be insulated by means of non-conductive material from the inner side walls 12 of the lantern, whereby said plate is supported.

To enable the lamp wick or wicks to be adjusted without opening the lantern, a small aperture for the passage of a winding-key for each wick-adjusting spindle 53 is provided, as at 54, in the side of the lantern-body below the level of the bottom plate 15 and a corresponding aperture in the coaming 44. To prevent the jarring produced by the working of the flash-shutter affecting the height of the wick, each wick-adjusting spindle 53 is braked, preferably, by a stiff spring attached to the burner and bearing against the spindle, so as to check its accidental rotation.

The lantern is provided with a main reflector 63 in rear of the source of light and preferably attached by spring-clips 64 to the door 30, and with a second or auxiliary reflector 65, which is attached likewise preferably by spring-clips 66 to the front wall 2 and adapted to return to the main reflector (or to the source of light) such forwardly-projected rays as would otherwise be lost. Both reflectors 63 and 65 may be spherical and concentric with the source of light, so as to return thereto all rays which may fall upon them. The auxiliary reflector 65 has a central aperture which registers with a corresponding aperture in the front wall 2 of the lantern-body, these apertures being of a size just sufficient to give passage to the beam of light on its way to the rear or negative lens (or combination of lenses) 67, the latter being mounted in a tube 68, adapted to slide through the aperture in plate 2, so as to be adjustable to suit the focal length of the lens or lenses.

In order to prevent access of air to the interior of the lantern should the lens 67 be withdrawn for any purpose, the aperture through which the tube 68 slides is provided externally with a pivoted shutter 69, whereby to temporarily close said aperture. In order to prevent dimming of the lens 67 by condensation of vapor upon its surface, narrow slits 70 are provided in the upper and lower sides of the lens-tube 68 outside its bearing in the plate 2, so as to permit air to circulate or pass across the inner surface of the lens.

The arrangement of lenses indicated in Fig. 2 is designed with a view to obtaining with a comparatively large source of light, such as the flame of an oil-lamp or gas-jet, and with lenses of cheap construction, such as can be readily replaced if injured by the rough usage to which military signaling apparatus is liable to be subjected, a beam having the least practicable angle of dispersion. The front or positive lens (or combination of lenses) 71 is carried at the front end of the arm 7, already mentioned, so as to be in alinement with the axis of the beam emitted by the lantern, the weight of the arm 7 and of the lantern-body approximately balancing one another on either side of the vertical axis of the tripod-head 5, as previously mentioned. The relative arrangement of the front or positive lens 71 and the rear or negative lens 67 to one another and to the source of light is such as to cause a comparatively narrow beam to be projected.

The employment of positive and negative lenses, as described, if the one be formed of crown and the other of flint glass, enables both chromatic and spherical aberration to be to a considerable extent corrected and the penetrative power of the beam to be correspondingly increased. It is also found in practice that by the employment of a lamp having more than one flat wick one behind the other, as shown, the illuminating power of the lantern is much increased and that a very appreciable further advantage results from the employment of the front reflector 65 in addition to the rear or main reflector 63.

The positive lens 71 is mounted removably on the arm 7 in any convenient manner—as, for example, by means of a squared stem 72, fitting in a correspondingly-squared hole in the arm—a thumb-screw 73 being provided for the purpose of securing the lens in position, or the stem of the lens might fit into a block adapted to slide in or on a guide in the arm 7 in a direction parallel to the optical axis, so as to allow of the position of the lens being adjusted for the purpose of regulating the angle of dispersion of the beam or for other reasons.

The lens-supporting arm 7 is pivoted at 74 to brackets on the casting 3, so as to be capable of being folded upward out of the way when not in use. When the arm 7 is extended, as shown, so as to bring the lens 71 into position for use, a downward projection or lug 75 on the arm rests against a stop on the casting 3 and may be secured in this position by a dowel-pin 77, so as to prevent the lens 71 from being thrown upward by violent gusts of wind.

The employment of an arrangement of lenses such as described enables a comparatively small light and rapidly-movable flashing-shutter to be used, the construction of the apparatus also enabling this shutter to be placed as nearly as possible directly over the axis of the tripod-head 5, so that little or no vibration will be caused by the operation of the shutter. The preferred form of shutter is a pair of crescent-shaped blades 78 79, pivoted about a common axis 80, so as to move in opposite directions in a plane perpendicular to the optical axis, the two blades being normally caused to overlap one another at their concave edges by a spring 81 and being caused to separate (in opposition to the force of the spring) so as to give passage to the beam by the pressure of the finger upon a push-piece 82. The axis 80 consists of a stud fixed in a carrier-plate 83, mounted immediately in front of the negative lens 67 and having an aperture registering therewith, the shutter-blades 78 79 working behind the carrier 83 and in front of the lens 67. The push-piece 82, which is situated directly over the optical axis, actuates both blades simultaneously through the medium of a slide 84, working in vertical guides at the front of carrier 83 and having the spring 81 attached to it and to a stud on said plate, as indicated, while pins 85 86, fixed to the respective blades 78 79, pass through segmental slots formed in the carrier-plate 83 concentrically with the axis 80 and engage in horizontal slots in the slide 84. In order that the shutter-blades may be retained in the open position when required, a sliding bolt 87, carried by plate 83, is fitted to engage over a shoulder 88 on the slide 84 when the latter is in its lowest position.

The carrier-plate 83 is hinged at its lower margin, as at 89, to brackets projecting forwardly from the plate 2, so as to be capable of being folded downward out of the way when it is desired to gain access to the negative lens 67. When in the vertical or operative position, the carrier 83 is held against stops 91, projecting forwardly from the plate 2, by means of a thumb-screw 92, turning in a bearing in the carrier 83 and entering a tapped hole in one of the stops 91, the screw 92 being provided with means whereby it is prevented from dropping out of its bearing.

For the purpose of enabling the beam to be precisely alined upon the distant station means are provided whereby the apparatus may itself be utilized as a sighting-telescope, the front lens 71 then serving as the objective and a telescopic eyepiece being provided for use in combination therewith. As the lens 71 when in operative position is in alinement with the axis of the beam, it follows that if the distant station be brought into the center of the field of view of the sighting-telescope constituted by said lens and the eyepiece the apparatus is correctly alined so as to throw the center of the beam from the lantern upon said station. Hence also the return-signals transmitted from the distant station may be received and read with great precision by means of the telescope.

In the preferred arrangement, which is that shown on the drawings, the eyepiece-tube 94 is mounted so as to be telescopically adjustable in an apertured box or frame 95, hinged, as at 96, to the shutter-carrier 83, (or it might be to the lantern-body,) the eyepiece 94 when in operative position projecting laterally of the apparatus, so as when in use to enable the distant station to be viewed conveniently by a person standing at one side of the lantern with the aid of an obliquely-disposed mirror 97, (or totally-reflecting prism,) contained within the box 95. This box, which is swung out of the way of the beam when the apparatus is being employed for signaling, is provided with a spring-catch 98, whereby to retain it in operative position against an adjustable screw-stop 99, carried by the plate 83 or by the lantern-body. Obviously when the eyepiece is in use for alining the apparatus or for reading return signals the flashing-shutter would be closed.

Having now particularly described and ascertained the nature of the said invention and in what manner the same is to be performed, I declare that what I claim is—

1. Optical signaling apparatus consisting of a lantern integral with a clamping-ring rotatable about the vertical axis of the lantern-support, an arm hinged to the lantern-body for carrying a lens, and a shutter interposed between the front of the lantern-body and said lens, the lantern-body and the hinged arm extending toward the rear and front respectively of said vertical axis so as to approximately counterbalance one another about their common point of support while the shutter is situated approximately in the plane of and directly over said vertical axis so as to prevent vibration of the apparatus when the shutter is operated.

2. In optical signaling and search-light apparatus the combination with a lantern of positive and negative lenses whereof the negative lens is interposed between the source of light and the positive lens substantially as and for the purposes specified.

3. An optical signaling and search-light apparatus, comprising a source of light, reflectors in front and behind the source of light, said front reflector having a central aperture to permit the passage of a beam of light and a lens supported in front of and at a distance from said aperture.

4. An optical signaling and search-light apparatus, comprising a lantern-body, a tube projecting from the front of the body and provided with slits communicating with the outer air, whereby to prevent dimming of the lens by condensation of vapor upon the surface thereof, an arm hinged to the lantern-body and projecting forwardly therefrom, and a positive lens supported by the arm.

5. In optical signaling and search-light apparatus, the combination with a lantern, of a flashing-shutter comprising a plurality of blades movable in their own planes in directions perpendicular to the axis of a beam of light, each of said blades being provided on its inner edge with a semicircular recess, the recesses coacting when the blades are open to form a circular opening for permitting the passage of a beam of light, and means for opening and closing said blades in unison.

6. In optical signaling and search-light apparatus, the combination with a lantern, of an arm hinged to the lantern-body and projecting therebeyond, means for limiting the downward movement of the arm, a support on the arm, and a lens mounted in the support.

7. In optical signaling and search-light apparatus, the combination with the lantern, of a carrier having an aperture hinged to the lantern-body, a flashing-shutter comprising a plurality of blades movably mounted in the carrier, each of said blades having a semicircular recess, the recesses coöperating to form a circular opening for permitting the passage of a beam of light when the blades are open, and means for manipulating the shutters in unison.

8. The combination with optical signaling apparatus comprising a lantern, a shutter and a lens situated at a distance from the lantern, of a telescopic eyepiece mounted in a carrier movably attached to the lantern-body and provided with an obliquely-disposed mirror or its optical equivalent, the eyepiece and its mirror being adapted to be brought to such position as to enable the apparatus to be utilized as a telescope for alining the beam of light upon the distant station and for receiving signals transmitted therefrom, by indirect vision.

AUGUSTUS ROSENBERG.

Witnesses:
H. D. JAMESON,
F. L. RAND.